United States Patent Office 3,420,622
Patented Jan. 7, 1969

3,420,622
PROCESS FOR OBTAINING FLUORINE COMPOUNDS FROM DIGESTION SOLUTIONS OF CRUDE PHOSPHATES WITH NITRIC ACID OR HYDROCHLORIC ACID
Ernst Dönges, Rudolf Kohlhaas and Albert Hloch, Frankfurt am Main, and Nikolaj Medić, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 17, 1966, Ser. No. 528,096
Claims priority, application Germany, Feb. 27, 1965, F 45,383
U.S. Cl. 23—88                   7 Claims
Int. Cl. C01b 33/10

---

ABSTRACT OF THE DISCLOSURE

A process has been provided for recovering fluorine values from crude phosphate by digesting the same with nitric acid, forming a suspension of finely divided calcium silicofluoride and recovering the silicofluoride by extracting the same with acidified water and precipitating the silicofluoride in the form of potassium silicofluoride. Similarly, a process has been provided for recovering the fluorine values from crude phosphate with aqueous hydrochloric acid by carefully controlling the water content of the digested crude phosphate mixture. The calcium silicofluoride suspension is obtained as a slurry of fine crystals from which the fluorine values are recovered by extracting with acidified water and the silicofluoride precipitated by means of potassum chlorde as potassium silicofluoride.

---

The present invention relates to a process for obtaining fluorine compounds from digestion solutions of crude phosphates with nitric acid or hydrochloric acid.

It is known that phosphate ores in the form of apatite (calcium fluophosphate) containing 2 to 4.5% of fluorine are the richest source of fluorine in the world.

In thermal digestion processes and in digestion processes with sulfuric acid the major part of the fluorine can be obtained from the escaping gases in the fohm of hydrogen fluoride and silicon tetrafluoride, while in the processes carried through with nitric acid or hydrochloric acid more than 90% of the crude fluophosphate remain in the so-called digestion solutions, partially in the dissolved state, partially in the form of a residue.

The present invention contributes towards the solution of the problem to extract the said amounts of fluorine from digestion solutions in the form of useful fluorine compounds. It provides a process for obtaining fluorine compounds from digestion solutions of crude phosphates with nitric acid or hydrochloric acid according to which the fluorine contained in the acid digestion solutions is substantially separated in the form of hydrated calcium silicofluoride ($CaSiF_6 \cdot 2H_2O$) which is insoluble in the said solutions and isolated therefrom.

In order to separate the fluorine the crude phosphate is digested with acids having a concentration such that the $CaSiF_6$ which forms and is generally readily soluble in water, is obtained in the digestion solutions in insoluble and solid form. In the process according to the invention the crude phosphate is digested with acids in such a concentration that the resulting digestion solutions, for obtaining as high a salting out effect of the salts as possible, contain 20 to 40% and preferably 28 to 32% of water in using nitric acid, and 40 to 60% and preferably 45 to 50% of water in using hydrochloric acid; the precipitating hydrated calcium silicofluoride $$(CaSiF_6 \cdot 2H_2O)$$

is then separated.

After having supercooled the digestion solution with nitric acid to 0 to $+10°$ C. it is suitable mechanically to separate the insoluble calcium silicofluoride and calcium fluoride from the coarser crystals of $Ca(NO_3)_2 \cdot 4H_2O$, for example by filtration or centrifugation.

It is advantageous to extract the insoluble fluorine compounds thus obtained with acidified water and to precipitate alkali metal silicofluorides from the calcium silicofluoride solution obtained by means of an alkali metal salt.

The following examples serve to illustrate the invention but they are not intended to limit it thereto.

Example 1

1 kilogram of crude phosphate ore containing 82% of tricalcium phosphate and 4.1% of fluorine was treated for about 2 hours at 40–60° C. with 2.2 kilograms of nitric acid of 60% strength. The amount of $HNO_3$ used was approximately 20% above the stoichiometric amount calculated on the calcium content. Only 0.2% of the total amount of fluorine evaporated.

The digestion solution obtained contained calcium nitrate, nitric acid, phosphoric acid ($H_3PO_4$) and about 1.2% of fluorine. About 0.4% of the fluorine was in solution while the remainder, i.e. 70% calculated on the total amount of fluorine, was obtained in solid form, mainly as suspended finely crystalline hydrated calcium silicofluoride ($CaSiF_6 \cdot 2H_2O$). In addition thereto the solution contained calcium fluoride and a small amount of non-digested phosphate ore.

The digestion solution was cooled to 5–10° C. and the precipitating calcium nitrate hydrate $$(Ca(NO_3)_2 \cdot 4H_2O)$$

was separated from the solution by centrifuging in a slotted centrifuge, the finely crystalline $$CaSiF_6 \cdot 2H_2O$$

and $CaF_2$ remaining in the solution in finely dispersed form.

1500 grams of crude calcium nitrate tetrahydrate were obtained as residue on the sieve and 1700 grams of a suspension containing 2.1% of fluorine. The suspension was clarified by means of a sedimentation centrifuge or a solid jacket centrifuge. In this manner, approximately 1500 grams of a clear solution were obtained containing 0.3%, i.e. about 11% of the total amount of fluorine. After neutralization with ammonia the solution was used for the manufacture of nitrogen-phosphorus compound fertilizer.

From the approximately 200 grams of the slurry-like residue in the centrifuge, calcium silicofluoride hydrate ($CaSiF_6 \cdot 2H_2O$) was extracted with water acidified with nitric acid (pH<1), the extract was filtered and in the filtrate $K_2SiF_6$ was precipitated by the addition of 70 grams of potassium chloride.

39 grams of potassium silicofluoride ($K_2SiF_6$) were obtained corresponding to 20.2 grams of fluorine or 49.5% of the total amount of fluorine present in the crude phosphate.

In 44 grams of the water-insoluble filter residue containing 21% of fluorine 9.2 grams of fluorine or 22% of the total amount of fluorine were found. The fluorine was recovered from the water-insoluble residue by distillation with sulfuric acid in the form of HF and $SiF_4$.

Hence, it follows that about 50% of the fluorine was obtained in the form of potassium silicofluoride and about 20% by distillation, i.e. 70% of the fluorine contained in the crude phosphate.

Flow Sheet of Example 1

Extraction of fluorine compounds from a digestion solution of crude phosphate with nitric acid

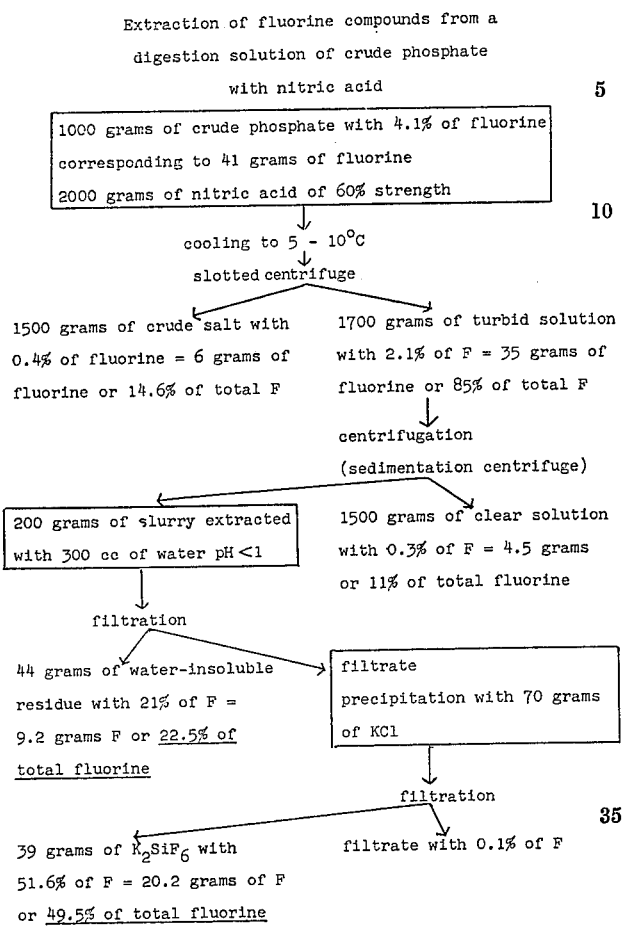

Flow sheet of Example 2

Extraction of fluorine compounds from a digestion solution of crude phosphate with hydrochloric acid

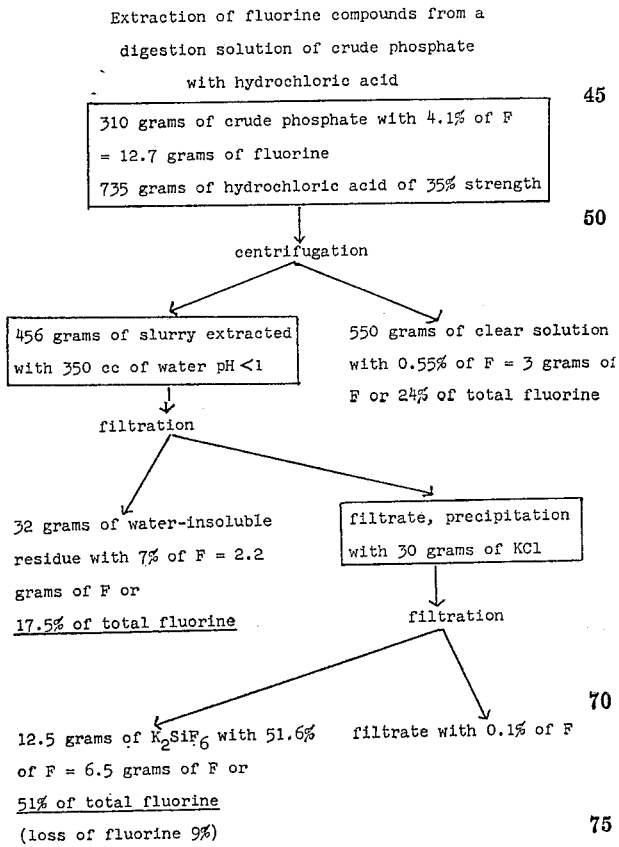

(loss of fluorine 9%)

Example 2

310 grams of crude phosphate containing approximately 4.1% of fluorine were mixed with 735 grams of hydrochloric acid of 35% strength. The mixture contained about 45% of water. After having been allowed to stand overnight the solid substance was separated from the solution by centrifugation. 550 grams of a clear solution were obtained containing 0.55% of fluorine, i.e. 3 grams of fluorine or 24% of the total fluorine, and 456 grams of a slurry which contained about 70% of the total amount of fluorine substantially in the form of calcium silicofluoride hydrate ($CaSiF_6 \cdot 2H_2O$). The slurry was extracted with 350 cc. of water acidified with hydrochloric acid (pH<1), the extract was filtered and the fluorine was precipitated by means of 30 grams of potassium chloride in the form of potassium silicofluoride ($K_2SiF_6$).

12.5 grams of $K_2SiF_6$ were obtained corresponding to 6.4 grams of fluorine or 50% of the total fluorine. The water-insoluble residue (32 grams) contained 7% of fluorine, corresponding to 2.2 grams of fluorine or 17% of the total amount of fluorine, which were recovered in the form of hydrogen fluoride and silicon tetrafluoride by the action of sulfuric acid.

In this manner 50% of the fluorine were obtained in the form of potassium silicofluoride and 17% of the fluorine by distillation, which corresponded to 67% of the total amount of fluorine contained in the crude phosphate.

What is claimed is:

1. A process for separating fluorine values from crude phosphate having as a major constituent calcium phosphate and having as a constituent part thereof fluorine in a combined form, said process comprising the steps of: digesting crude phosphate with aqueous hydrochloric acid to form a suspended, finely crystalline calcium silicofluoride hydrate in an aqueous solution, said aqueous solution containing from 40 to 60% of water; separating by centrifuging from the digested mixture a slurry of the suspended, crystalline calcium silicofluoride hydrate; extracting calcium silicofluoride hydrate from said slurry with water acidified with hydrochloric acid, said acidified water being at a pH of less than 1; precipitating the calcium silicofluoride hydrate with potassium chloride as a potassium silicofluoride; and recovering the precipitated potassium silicofluoride.

2. The process according to claim 1 wherein the hydrochloric acid contained digestion mixture comprises 45 to 50% of water.

3. A process for separating fluorine values from crude phosphate having as a major constituent calcium phosphate and having as a constituent part thereof fluorine in a combined form, said process comprising the steps of: digesting crude phosphate with a stoichiometric excess of aqueous nitric acid, said excess being based on the calcium content of said crude phosphate, to form calcium nitrate hydrate and suspended, finely crystalline hydrated calcium silicofluoride in an aqueous solution, said aqueous solution containing from 20 to 40% of water; cooling to below +10° C. the digested mixture to cause precipitation of calcium nitrate hydrate; separating the formed calcium nitrate hydrate from the digested mixture containing the suspended finely crystalline hydrated calcium silicofluoride; recovering a slurry of finely crystalline hydrated calcium silicofluoride from the digested mixture from which calcium nitrate hydrate had been separated; extracting calcium silicofluoride hydrate from said slurry with water acidified with nitric acid of a pH of less than 1; filtering the obtained solution of said extracted calcium silicofluoride hydrate; adding to the filtered solution potassium chloride to form potassium silicofluoride from calcium silicofluoride hydrate; and precipitating and recovering potassium silicofluoride from the solution to which potassium chloride had been added.

4. A process as claimed in claim 3 wherein the crude phosphate is digested with aqueous nitric acid and the resulting solution comprises 28% to 32% of water.

5. A process as claimed in claim 3 wherein the calcium nitrate hydrate is separated from the digested and cooled solution in a slotted centrifuge zone.

6. A process as claimed in claim 3 wherein the calcium silicofluoride hydrate is separated in a sedimentation centrifuging zone from the digested mixture from which calcium nitrate hydrate had been previously separated.

7. The process according to claim 3 wherein the digested mixture is supercooled to a temperature in the range from 0° C. to +10° C.

References Cited

UNITED STATES PATENTS

| | | | |
|---|---|---|---|
| 2,152,364 | 3/1939 | Seyfried | 23—88 |
| 2,410,043 | 10/1946 | Breton et al. | 23—88 |
| 2,447,359 | 8/1948 | Oakley | 23—88 |
| 2,556,064 | 6/1951 | Caldwell et al. | 23—88 |
| 2,636,806 | 4/1953 | Winter | 23—88 |
| 2,683,075 | 7/1954 | Caldwell | 23—88 XR |
| 2,853,363 | 9/1958 | Sidun et al. | 23—88 |
| 3,002,812 | 10/1961 | Williams | 23—109 |
| 3,092,487 | 6/1963 | Nero-Hacohen | 23—88 XR |
| 3,323,864 | 6/1967 | Lapple | 23—88 XR |

EARL C. THOMAS, *Primary Examiner.*

EDWARD STERN, *Assistant Examiner.*

U.S. Cl. X.R.

23—102